United States Patent
Gupta et al.

(10) Patent No.: US 10,331,686 B2
(45) Date of Patent: Jun. 25, 2019

(54) CONDUCTING SEARCH SESSIONS UTILIZING NAVIGATION PATTERNS

(71) Applicant: MICROSOFT CORPORATION, Redmond, WA (US)

(72) Inventors: Anoop Gupta, Woodinville, WA (US); Xuedong Huang, Bellevue, WA (US)

(73) Assignee: MICROSOFT CORPORATION, Redmond, WA (US)

( * ) Notice: Subject to any disclaimer, the term of this patent is extended or adjusted under 35 U.S.C. 154(b) by 0 days.

(21) Appl. No.: 13/804,001

(22) Filed: Mar. 14, 2013

(65) Prior Publication Data
US 2014/0279991 A1    Sep. 18, 2014

(51) Int. Cl.
*G06F 17/30*   (2006.01)
*G06F 16/2458*   (2019.01)
*G06F 16/951*   (2019.01)
*G06F 16/9535*   (2019.01)

(52) U.S. Cl.
CPC ........ *G06F 16/2468* (2019.01); *G06F 16/951* (2019.01); *G06F 16/9535* (2019.01)

(58) Field of Classification Search
CPC ........ G06F 17/30864; G06F 17/30867; G06Q 30/02
USPC ....... 707/706, 739, 769, 802, 710, 798, 709; 706/46, 50; 715/738; 705/7.31, 14.52
See application file for complete search history.

(56) References Cited

U.S. PATENT DOCUMENTS

| | | | |
|---|---|---|---|
| 7,162,473 B2 | 1/2007 | Dumais et al. | |
| 7,562,068 B2 * | 7/2009 | Naam ................ | G06F 17/30867 |
| 7,580,930 B2 * | 8/2009 | Brave ................ | G06F 17/30867 |
| 7,610,282 B1 | 10/2009 | Datar et al. | |
| 7,702,690 B2 * | 4/2010 | Brave et al. ................... | 707/776 |
| 7,774,335 B1 * | 8/2010 | Scofield ............ | G06F 17/30864 |
| | | | 707/709 |
| 7,801,896 B2 * | 9/2010 | Szabo .......................... | 707/739 |

(Continued)

FOREIGN PATENT DOCUMENTS

TW    200846953 A    12/2008

OTHER PUBLICATIONS

"International Search Report & Written Opinion for PCT Patent Application No. PCT/US2014/023108", dated Jun. 25, 2014, Filed Date: Mar. 11, 2014, 10 Pages.

(Continued)

*Primary Examiner* — Jeff A Burke
(74) *Attorney, Agent, or Firm* — Shook, Hardy & Bacon L.L.P.

(57) ABSTRACT

Systems, methods, and computer-readable storage media are provided for conducting searches utilizing search navigation patterns. Search queries are received that include search terms that are of a particular type. It is recognized that at least one prior search session has been conducted that included a search query having search terms of an equivalent or similar type and followed a particular navigation pattern. Such prior search(es) may have been conducted by the user or by a different user and/or may have a navigation pattern that was affirmatively recorded by the requesting user or that was recorded by the system without explicit contemporaneous user instruction to do so. Upon identifying the navigation pattern associated with the prior search, the system effectively conducts a search session following the navigation pattern.

18 Claims, 3 Drawing Sheets

(56) References Cited

U.S. PATENT DOCUMENTS

| | | | | |
|---|---|---|---|---|
| 7,818,315 | B2* | 10/2010 | Cucerzan | G06F 17/30864 707/723 |
| 8,005,919 | B2* | 8/2011 | Mehanna | G06F 17/30867 709/217 |
| 8,073,866 | B2* | 12/2011 | Eagle et al. | 707/770 |
| 8,185,512 | B2 | 5/2012 | Brodfuehrer et al. | |
| 8,239,370 | B2* | 8/2012 | Wong | G06F 17/30693 707/713 |
| 8,775,478 | B2* | 7/2014 | Kaufman et al. | 707/802 |
| 8,862,579 | B2* | 10/2014 | Wissner | G06F 17/30864 707/709 |
| 9,064,016 | B2* | 6/2015 | Shokouhi | G06F 17/30867 |
| 9,294,635 | B2* | 3/2016 | Gowen | G06F 3/0484 |
| 2001/0037325 | A1* | 11/2001 | Biderman | G06F 17/30864 |
| 2002/0143749 | A1* | 10/2002 | Hartel | G06F 17/3064 |
| 2003/0004995 | A1* | 1/2003 | Novaes | G06F 17/30994 715/272 |
| 2003/0046281 | A1* | 3/2003 | Son | G06F 17/30876 |
| 2004/0161150 | A1* | 8/2004 | Cukierman | G06K 9/222 382/186 |
| 2005/0144158 | A1* | 6/2005 | Capper | G06F 17/30696 |
| 2006/0020566 | A1* | 1/2006 | Wu | G06Q 10/10 706/50 |
| 2006/0069995 | A1* | 3/2006 | Thompson et al. | 715/700 |
| 2006/0074898 | A1* | 4/2006 | Gavalda | G06F 17/30684 |
| 2006/0149782 | A1* | 7/2006 | Yeh et al. | 707/103 X |
| 2007/0033531 | A1* | 2/2007 | Marsh | G06F 17/30864 715/738 |
| 2007/0162481 | A1* | 7/2007 | Millett | G06F 17/30613 |
| 2007/0168354 | A1* | 7/2007 | Ramer | G06F 17/30749 |
| 2008/0005068 | A1 | 1/2008 | Dumais et al. | |
| 2008/0120289 | A1* | 5/2008 | Golan et al. | 707/5 |
| 2008/0162475 | A1* | 7/2008 | Meggs | G06Q 30/02 |
| 2008/0243785 | A1* | 10/2008 | Stading | G06F 17/30867 |
| 2009/0100021 | A1* | 4/2009 | Morris | G06F 17/30876 |
| 2009/0171813 | A1* | 7/2009 | Byrne | G06F 17/30867 705/26.1 |
| 2009/0292674 | A1* | 11/2009 | Dasdan | G06F 17/3064 |
| 2009/0307168 | A1* | 12/2009 | Bockius | G06F 17/30867 706/46 |
| 2010/0094868 | A1* | 4/2010 | Leung | G06F 17/30861 707/726 |
| 2010/0138264 | A1* | 6/2010 | Faris | G06Q 10/10 705/7.31 |
| 2010/0268699 | A1* | 10/2010 | Naam | G06F 17/30696 707/706 |
| 2010/0274815 | A1* | 10/2010 | Vanasco | 707/798 |
| 2011/0029539 | A1* | 2/2011 | Raichura | G06F 17/30442 707/741 |
| 2011/0125783 | A1* | 5/2011 | Whale et al. | 707/769 |
| 2011/0179013 | A1 | 7/2011 | Jiang et al. | |
| 2011/0288877 | A1* | 11/2011 | Ofek et al. | 705/2 |
| 2011/0289068 | A1 | 11/2011 | Teevan et al. | |
| 2012/0167146 | A1* | 6/2012 | Incorvia | H04N 21/23431 725/60 |
| 2012/0239498 | A1* | 9/2012 | Ramer | H04H 60/46 705/14.53 |
| 2012/0265744 | A1* | 10/2012 | Berkowitz | G06F 17/30873 707/705 |
| 2013/0006764 | A1* | 1/2013 | Zhang | G06Q 30/0254 705/14.52 |
| 2013/0173571 | A1* | 7/2013 | Chen | G06F 17/30 707/706 |
| 2013/0204895 | A1* | 8/2013 | Liao | G06F 17/30864 707/772 |
| 2014/0096037 | A1* | 4/2014 | Grosz | 715/753 |
| 2014/0122655 | A1* | 5/2014 | Guo et al. | 709/219 |
| 2014/0149399 | A1* | 5/2014 | Kurzion | G06F 17/30867 707/723 |
| 2014/0222762 | A1* | 8/2014 | Fallon | H04N 1/32101 707/665 |
| 2014/0280015 | A1* | 9/2014 | Marantz et al. | 707/710 |

OTHER PUBLICATIONS

Jansen, et al., "Patterns of Query Reformulation During Web Searching", In Journal of the American Society for Information Science and Technology, Mar. 25, 2009, pp. 1358-1371.

Mayil, V. Valli, "Web Navigation Path Pattern Prediction Using First Order Markov Model and Depth first Evaluation", In International Journal of Computer Applications, vol. 45, Issue 16, May 2012, 6 pages.

Wellhausen, Tim, "User Interface Design for Searching", Published on: Jan. 13, 2006, Available at: http://www.tim-wellhausen.de/papers/UIForSearching.pdf.

Ling, et al., "Mining Generalized Query Patterns from Web Logs", In Proceedings of the 34th Annual Hawaii International Conference on System Sciences, Jan. 3, 2001, 9 pages.

"Thomson Innovation Training Manual", Retrieved on: Aug. 7, 2012, Available at: http://info.thomsoninnovation.com/sites/default/files/assets/ti_training_manual.pdf.

International Preliminary Report on Patentability dated Jun. 1, 2015 in Application No. PCT/US2014/023108, 7 pages.

"Second Written Opinion Issued in PCT Patent Application No. PCT/US2014/023108", dated Feb. 27, 2015 6 Pages.

Komlodi, et al., "Search History Support for Finding and Using Information: User Interface Design Recommendations from a User Study", Published in Information Processing & Management, vol. 43, Issue 1, Jan. 1, 2007, pp. 10-29.

"Office Action and Search Report Issued in Taiwan Patent Application No. 103107638", dated Aug. 3, 2017, 7 Pages \* cited by examiner

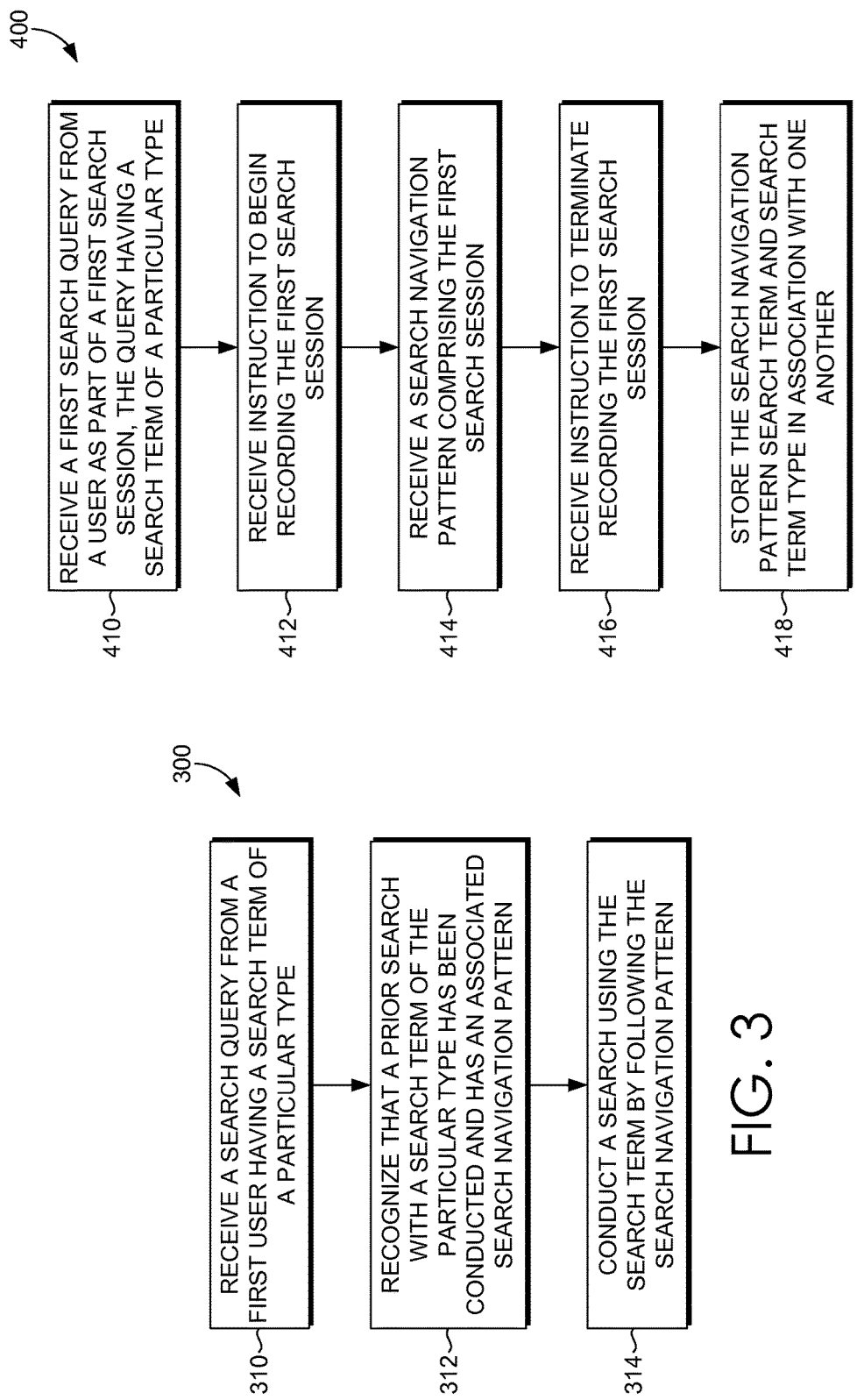

CONDUCTING SEARCH SESSIONS UTILIZING NAVIGATION PATTERNS

BACKGROUND

Users often conduct search sessions that include a series of related individual searches or that involve selection of a series of results to a single search (which itself may comprise a search session), some or all such serial searches offering items of information of interest to the user. For certain types of search queries (that is, queries related to a particular entity, category, other hierarchical classification, or the like), largely equivalent information is often desired that is specific to the particular query terms. For instance, a user shopping for a car may input the make and model of the car as a search query and then visit the manufacturer's website, a consumer reports site, a blue book value site, one or more local dealer sites, and one or more consumer review sites. If the user desires to repeat this type of search for another make and model, s/he must remember and repeat the series of steps that made up the search session.

Additionally, users often conduct similar searches that involve inputting standard user information each and every time. For instance, users that travel frequently and desire to find the "best" flight each time based on time of flight and expense, must enter parameters defining the preferred times of travel, the departure airport, number of persons traveling, frequent flyer numbers, and the like, each time a search is conducted for finding the "best" flight. Such is time consuming and tedious for the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for conducting search sessions utilizing search navigation patterns. Search queries are received that include search terms that are of a particular type, for instance, related to a particular entity, category, other hierarchical classification, or the like. It is then recognized that at least one prior search session has been conducted that included a search query having one or more search terms of an equivalent or similar type and followed a particular navigation pattern. Such prior search(es) may have been conducted by the user or by a different user and/or may have a navigation pattern that was affirmatively recorded by the requesting user or that was recorded by the system without explicit contemporaneous user instruction to do so. Upon identifying the navigation pattern associated with the prior search, the system effectively conducts a search session following the navigation pattern although, to the user, it may appear as though only a single search has taken place. Search results may be provided in response to the received search query that include information or links associated with intermediate steps in the navigation pattern.

BRIEF DESCRIPTION OF THE DRAWINGS

The present invention is illustrated by way of example and not limitation in the accompanying figures in which like reference numerals indicate similar elements and in which:

FIG. 3 is a flow diagram showing an exemplary method for conducting search sessions utilizing navigation patterns, in accordance with an embodiment of the present invention;

FIG. 4 is a flow diagram showing an exemplary method for conducting search sessions utilizing recorded navigation patterns, in accordance with an embodiment of the present invention.

DETAILED DESCRIPTION

Figure 1:
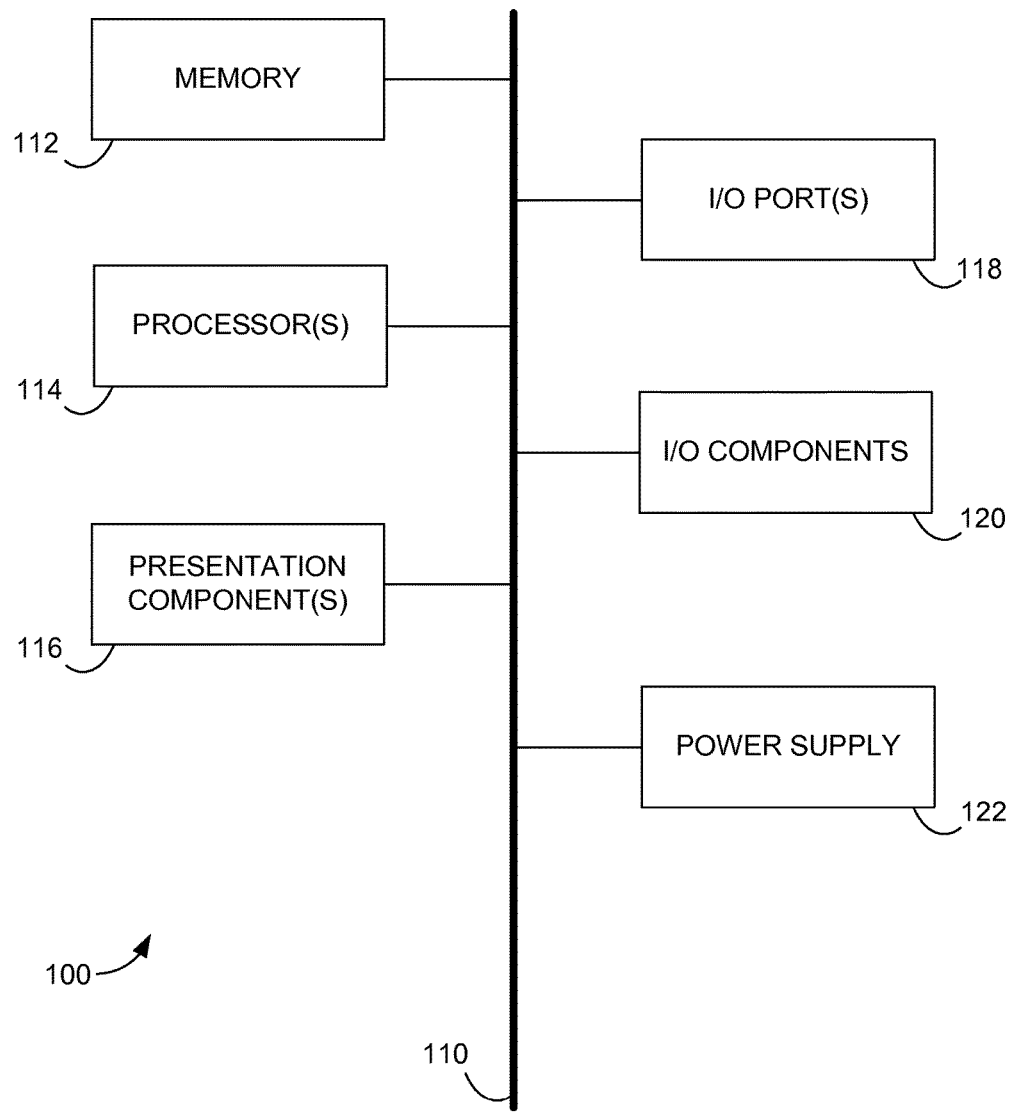
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for conducting search sessions utilizing pre-existing search navigation patterns. Search queries are received that include search terms that are of a particular type, for instance, related to a particular entity, category, other hierarchical classification, or the like. It is then recognized that at least one prior search session has been conducted that included a search query having one or more search terms of an equivalent or similar type and followed a particular navigation pattern. Such prior search(es) may have been conducted by the user or by a different user and/or may have a navigation pattern that was affirmatively recorded by the requesting user or that was recorded by the system without explicit contemporaneous user instruction to do so. Upon identifying the navigation pattern associated with the prior search, the system effectively conducts a search session following the navigation pattern. In embodiments, search results are provided in response to the received search query that include information or links associated with intermediate steps in the navigation pattern making it easier for the user to access desired information without having to repeat the navigation pattern step-by-step.

Accordingly, one embodiment of the present invention is directed to one or more computer-readable storage media storing computer-useable instructions that, when used by one or more computing devices, cause the one or more computing devices to perform a method for conducting search sessions utilizing navigation patterns. The method includes receiving a search query from a first user, the search query having at least one search term of a particular type. The method further includes recognizing that at least one prior search session having a search term of the particular type has been conducted, the at least one prior search session having a navigation pattern associated therewith. Still further, the method includes conducting a search session utilizing the at least one search term by following the navigation pattern.

In another embodiment, the present invention is directed to a method being performed by one or more computing devices including at least one processor, the method for conducting search sessions utilizing recorded navigation patterns. The method includes receiving a first search query from a user as part of a first search session, the first search query having at least one search term of a particular type. The method further includes receiving a first instruction to begin recording the first search session, receiving a search navigation pattern comprising the first search session, receiving a second instruction to terminate recording the first search session, and storing the search navigation pattern and the at least one search term of the first search query, including the particular type, in association with one another.

In yet another embodiment, the present invention is directed to a system including a search engine having one or more processors and one or more computer-readable storage media, and a data store coupled with the server. The search engine is configured to receive a search query from a first user, the search query having at least one search term of a particular type. The search engine is further configured to recognize that at least one prior search session having a search term of the particular type has been conducted by at least one of the first user or a second user that differs from the first user, the at least one prior search session having a search navigation pattern associated therewith. Still further, the search engine is configured to conduct a search session utilizing the at least one search term by following the search navigation pattern and provide a plurality of search results in response to the second search query. In embodiments, at least a portion of the plurality of search results is associated with an intermediate step within the search navigation pattern.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like. Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "search engine" is used herein, it will be recognized that this term may also encompass a server, a Web browser, a set of one or more processes distributed on one or more computers, one or more stand-alone storage devices, a set of one or more other computing or storage devices, a combination of one or more of the above, and the like.

As previously mentioned, embodiments of the present invention are generally directed to systems, methods, and computer-readable storage media for conducting searches utilizing search navigation patterns. Search queries are received that include search terms that are of a particular type, for instance, related to a particular entity, category, other hierarchical classification, or the like. It is then recognized that at least one prior search session has been conducted that included a search query having one or more search terms of an equivalent or similar type and followed a particular navigation pattern. Such prior search(es) may have been conducted by the user or by a different user and/or may have a navigation pattern that was affirmatively recorded by the requesting user or that was more passively recorded by the system without explicit user instruction to do so. Upon identifying the navigation pattern associated with the prior search, the system effectively conducts a search session following the navigation pattern. Search results may be provided in response to the received search query that include information or links associated with intermediate steps in the navigation pattern.

Figure 2:
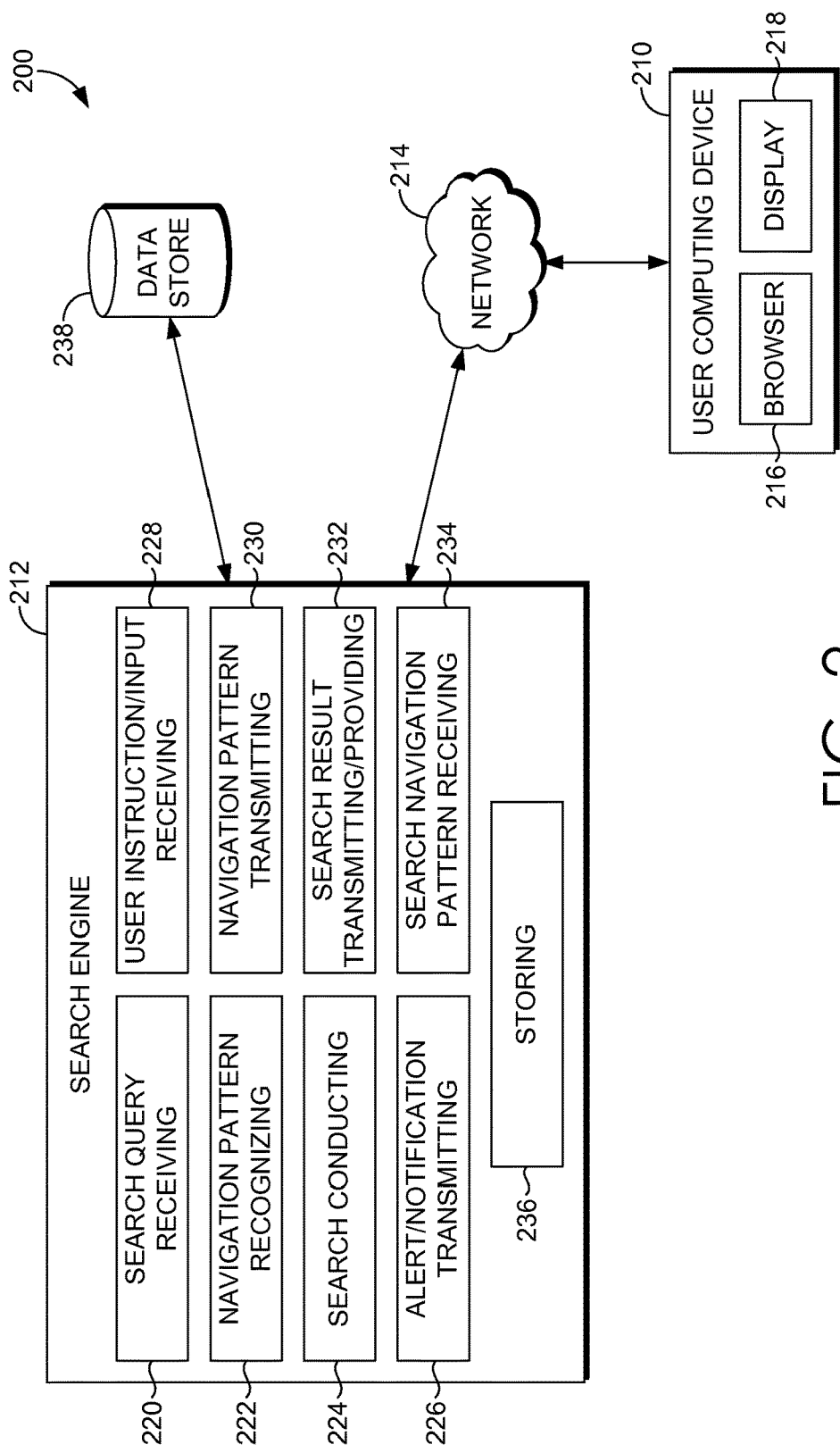
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which search session may be conducted utilizing pre-existing search navigation patterns. Among other components not shown, the computing system 200 generally includes a user computing device 210 and a search engine 212 in communication with one another via a network 214. The network 214 may include, without limitation, one or more local area networks (LANs) and/or wide area networks (WANs). Such networking environments are commonplace in offices, enterprise-wide computer networks, intranets and the Internet. Accordingly, the network 214 is not further described herein.

It should be understood that any number of user computing devices 210 and/or search engines 212 may be employed in the computing system 200 within the scope of embodiments of the present invention. Each may comprise a single device/interface or multiple devices/interfaces cooperating in a distributed environment. For instance, the search engine 212 may comprise multiple devices and/or modules arranged in a distributed environment that collectively provide the functionality of the search engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the search engine 212, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines and/or user computing devices. By way of example only, the search engine 212 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a browser 216 and a display 218. The browser 216, among other things, is configured to render search engine home pages (or other online landing pages) and search engine results pages (SERPs), in association with the display 218 of the user computing device 210. The browser 216 is further configured to receive user input of requests for various web pages (including search engine home pages), receive user input search queries (generally input via a user interface presented on the display 218 and permitting alpha-numeric and/or textual input into a designated search input region) and to receive content for presentation on the display 218, for instance, from the search engine 212. It should be noted that the functionality described herein as being performed by the browser 216 may be performed by any other application, application software, user interface, or the like capable of rendering Web content. It should further be noted that embodiments of the present invention are equally applicable to mobile computing devices and devices accepting touch and/or voice input. Any and all such variations, and any combination thereof, are contemplated to be within the scope of embodiments of the present invention.

The search engine 212 of FIG. 2 is configured to, among other things, receive search queries and provide search results in response thereto in accordance with pre-existing search navigation patterns. The search engine 212 is additionally configured to, among other things, record navigation patterns associated with search sessions. As illustrated, the search engine 212 includes a search query receiving component 220, a navigation pattern recognizing component 222, a search conducting component 224, an alert/notification transmitting component 226, a user instruction/input receiving component 228, a navigation pattern transmitting component 230, a search result transmitting/providing component 232, a search navigation pattern receiving component 234, and a storing component 236. The illustrated search engine 212 also has access to a data store 238. The data store 238 is configured to store information related to search queries, search results and search navigation patterns. In various embodiments, such information may include, without limitation, search queries, types associated with various search terms included within search queries, search navigation patterns (affirmatively or passively recorded), user identifiers associated with search queries and/or search navigation patterns, and the like. In embodiments, the data store 238 is configured to be searchable for one or more of the items stored in association therewith. It will be understood and appreciated by those of ordinary skill in the art that the information stored in association with the data store 238 may be configurable and may include any information relevant to search queries/terms and search navigation patterns. The content and volume of such information are not intended to limit the scope of embodiments of the present invention in any way. Further, though illustrated as a single, independent component, the data store 238 may, in fact, be a plurality of storage devices, for instance a database cluster, portions of which may reside in association with the search engine 212, the user computing device 210, another external computing device (not shown), and/or any combination thereof.

The search query receiving component 220 of the search engine 212 is configured to receive search queries input by users, for instance, utilizing the browser 216 of the user computing device 210. Search queries typically include one or more search terms, each search term including a single word or multiple words comprising a phrase. Search terms may be categorized as belonging to particular entities or based upon any type of hierarchical classification known to those of ordinary skill in the art. In embodiments, the search query receiving component 220 of the search engine 212 additionally may be configured to recognize a type (e.g., entity, category, other classification, or the like) associated with one or more terms of a received search query.

The search navigation pattern recognizing component 222 of the search engine 212 is configured to examine a received search query and recognize whether at least one prior search session having one or more search terms of the same type as a search term in the received search query, has previously been conducted. Such prior search session may have been conducted by the requesting user or by a different, similarly situated user. (Note that in embodiments, the navigation pattern recognizing component 222 of the search engine 212 may be configured to recognize a type (e.g., entity, category, other classification, or the like) associated with one or more terms of a received search query, rather than the search query receiving component 220.) Further, such prior search session may have been affirmatively recorded by the prior search requesting user or more passively recorded by the system, as more fully described below.

As described herein above, users often conduct search sessions that include a series of related individual searches or that involve selection of a series of results to a single search (which itself may comprise a search session), some or all such serial searches offering items of information of interest to the user. The series of related searches and/or the serial result selection from one or more searches make up a search navigation pattern that the requesting user, or another user similarly situated or that desires to obtain similar information, may desire to repeat at a later point in time. The search navigation pattern recognizing component 222 of the search engine 212, upon recognizing that at least one prior search session having one or more search terms of the same type as a search term in the received search query, has previously been conducted, is additionally configured to recognize a search navigation pattern associated with the at least one prior search session.

The search conducting component 224 of the search engine 212 is configured to conduct a search session utilizing the received search query (and/or the one or more search terms having a type for which a prior search has been conducted) by following the recognized search navigation pattern. In embodiments, even if a prior search session involved a series of related searches conducted one after the other, the search conducted by following the recognized search navigation pattern may include only a single search when viewed from the user's perspective. That is, one or more results of interest from some or all of the prior serial searches comprising a single search session may be presented to the user simultaneously in response to the single search query. In this way the user does not have to complete the entire series of searches but may obtain the benefit of all of the related serial searches by conducting only a single search.

In embodiments, the search conducting component 224 of the search engine 212 may conduct a search session in accordance with a recognized search navigation pattern automatically and transparently from the user's perspective. In other embodiments, the search conducting component 224 may conduct a search session by following a recognized search navigation pattern after receiving confirmation that the user's desires the recognized search navigation pattern to be followed. Thus, the alert/notification transmitting component 226 of the search engine 212 is configured to transmit a notification to a user that submitted a search query that at least one prior search session having a search term of the same or a similar type has been conducted and to provide the requesting user the opportunity to indicate whether or not a search in accordance with the associated search navigation pattern is desired. The user instruction/input receiving component 228 of the search engine 212 is configured to receive input (confirmation or otherwise) as to whether the user desires the search navigation pattern to be followed.

In embodiments, users may desire to affirmatively record a search session. In this regard, a selectable "record" option may be provided to the user, for instance, in association with a toolbar or the like associated with a search engine home page or browser. Upon selection of the "record" option, the ensuing search session may be recorded until such time as the user selects to terminate the recording. Thus, in embodiments, the user instruction/input receiving component 228 of the search engine 212 further is configured to receive a first user instruction to begin recording a search session and to receive a second user instruction to terminate recording the search session.

The navigation pattern transmitting component 230 of the search engine 212 is configured transmit a visualization of at least one search session associated with a recognized search navigation pattern (which, in embodiments, may simply involve transmitting the prior search navigation pattern) so that the user may be permitted the opportunity to edit the search navigation pattern. The user instruction/input receiving component 228 of the search engine 212 additionally is configured to receive input from the user of any edits desired to a prior search navigation pattern.

The search result transmitting/providing component 232 of the search engine 212 is configured to provide at least one search result in response to a received search query. In embodiments, at least a portion of the provided/transmitted search result(s) is associated with an intermediate step within a search navigation pattern followed in conducting the search. For instance, one or more search results from some or all of the searches in a series of prior related searches comprising a single search session may be presented to the user simultaneously in response to the single search query, a search result from any of the serial searches other than the final one being considered an intermediate step within a search navigation pattern followed in conducting the search.

In embodiments, the search result transmitting/providing component 232 of the search engine 212 further is configured to provide at least one search result having one or more fields pre-populated utilizing at least one information item extracted from a previous search session conducted by the user and/or extracted from a profile associated with the user. In this way, standard information that a user enters each time s/he conducts a search in accordance with a particular search navigation pattern may be pre-populated, saving the user time and effort and, in some instances, providing more relevant search results.

The search navigation pattern receiving component 234 of the search engine 212 is configured to receive search navigation patterns conducted by users. Such search navigation patterns may be affirmatively recorded by the conducting user or may be more passively and automatically recorded by the system 200 without explicit user instruction to do so. The storing component 236 of the search engine 212 is configured to store received search navigation patterns, for instance, in association with a data store (e.g., data store 238).

Turning now to FIG. 3, a flow diagram is illustrated showing an exemplary method 300 for conducting searches utilizing navigation patterns. As indicated at block 310, a search query is received from a first user (e.g., utilizing the search query receiving component 220 of the search engine 212 of FIG. 2), the search query having at least one search term of a particular type. As indicated at block 312, it is recognized that at least one prior search has been conducted where the search query included a search term of the particular type (e.g., utilizing the navigation pattern recognizing component 222 of the search engine 212 of FIG. 2), the prior search having a navigation pattern associated therewith. A search is then conducted utilizing the at least one search term and following the navigation pattern, as indicated at block 314. This may be done, for instance, utilizing the search conducting component 224 of the search engine 212 of FIG. 2.

With reference now to FIG. 4, a flow diagram is illustrated showing an exemplary method 400 for conducting searches utilizing recorded navigation patterns. As indicated at block 410, a first search query is received from a user as part of a first search session (e.g., utilizing the search query receiving component 220 of the search engine 212 of FIG. 2). The first search query includes at least one search term of a particular type. As indicated at block 412, a first instruction is received to begin recording the first search session (e.g., utilizing the user instruction/input receiving component 228 of the search engine 212 of FIG. 2). The search session proceeds in accordance with a search navigation pattern, as indicated at block 414, for instance, utilizing the search conducting component 224 of the search engine 212 of FIG. 2. As indicated at block 416, a second instruction is received to terminate recording the first search session (e.g., utilizing the user instruction/input receiving component 228 of the search engine 212 of FIG. 2). The search navigation pattern and the at least one search term of the first search query, including the particular type, are then stored in association with one another. This is indicated at block 418 and may be conducted, for instance, utilizing the storing component 236 of the search engine 212 of FIG. 2).

As can be understood, embodiments of the present invention provide systems, methods, and computer-readable storage media for, among other things, conducting searches utilizing search navigation patterns. Search queries are received that include search terms that are of a particular type, for instance, related to a particular entity, category, other hierarchical classification, or the like. It is then recognized that at least one prior search session has been conducted that included a search query having one or more search terms of an equivalent or similar type and followed a particular navigation pattern. Such prior search(es) may have been conducted by the user or by a different user and/or may have a navigation pattern that was affirmatively recorded by the requesting user or that was more passively recorded by the system without explicit user instruction to do so. Upon identifying the navigation pattern associated with the prior search, the system effectively conducts a search session following the navigation pattern. Search results may be provided in response to the received search query that include information or links associated with intermediate steps in the navigation pattern.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3 and 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A computer-implemented system for conducting search sessions utilizing navigation patterns, comprising:
    one or more computing devices, each having a processor coupled to one or more memory storage devices, operate to;
    automatically record, in the one or more memory storage devices, a navigation pattern that is included in at least one prior search session for a search term of a particular type, wherein the navigation pattern comprises a series of searches that are related to a same entity in the at least one prior search session, the series of searches being conducted from a user computing device;
receive, over a computer network and from the user computing device, a new search query generated from a user interface of the user computing device, the new search query having at least one search term of the particular type;
automatically follow the navigation pattern of the at least one prior search session by conducting the series of searches related to the same entity in a subsequent search session utilizing the at least one search term; and
in response to the following of the navigation pattern, simultaneously, cause display, over the computer network, of a plurality of search results in the subsequent search session to a display device of the user computing device as search results from a single search when viewed from the user's perspective, wherein the plurality of displayed search results comprises search results from at least two different searches of the series of searches conducted in the at least one prior search session.

2. The computer-implemented system of claim 1, wherein the at least one prior search session was conducted by the first user.

3. The computer-implemented system of claim 1, wherein the at least one prior search session was conducted by a second user.

4. The computer-implemented system of claim 1, wherein the at least one prior search session was recorded by a requesting user.

5. The computer-implemented system of claim 1, further comprising:
the one or more computing devices operate to receive confirmation from the first user prior to conducting the subsequent search session utilizing the at least one search term by following the navigation pattern.

6. The computer-implemented system of claim 1, further comprising:
the one or more computing devices operate to transmit a visualization of the at least one prior search session; and
the one or more computing devices operate to permit the first user to edit the navigation pattern.

7. The computer-implemented system of claim 1, further comprising the one or more computing devices operate to provide another search result having one or more fields pre-populated utilizing at least one information item extracted from a previous search session conducted by the first user.

8. The computer-implemented system of claim 1, further comprising the one or more computing devices operate to provide another search result having one or more fields pre-populated utilizing at least one information item extracted from a profile associated with the first user.

9. A method being performed by one or more computing devices including at least one processor, comprising:
receiving a first search query from a user as part of a first search session, the first search query having at least one search term of a particular type;
receiving a first instruction from the user to begin recording the first search session;
upon receiving the first instruction, initiating a recording of the first search session that comprises a series of related searches associated with the at least one search term of the particular type, the series of related searches forming a search navigation pattern;
receiving a second instruction from the user to terminate recording the first search session;
storing the search navigation pattern and the at least one search term of the first search query, including the particular type, in association with one another;
receiving a second search query from the user as part of a second search session, the second search query having at least one search term of the particular type;
conducting the second search session based upon the second search query following the series of related searches in the search navigation pattern formed in the first search session; and
simultaneously presenting a plurality of search results in the second search session to the user as search results from a single search when viewed from the user's perspective, wherein the plurality of search results comprises search results from at least two different searches in the series of related searches in the search navigation pattern.

10. The method of claim 9, wherein the method further comprises receiving a third instruction from the user to conduct the second search session based upon the second search query following the search navigation pattern.

11. The method of claim 9, wherein the method further comprises:
transmitting a notification that the search navigation pattern is available; and
receiving a third instruction from the user to conduct the second search session based upon the second search query following the search navigation pattern.

12. The method of claim 9, wherein the method further comprises providing, in response to the second search query, at least one search result having one or more fields pre-populated utilizing at least one information item extracted from a previous search conducted by the user.

13. The method of claim 9, wherein the method further comprises providing, in response to the second search query, at least one search result having one or more fields pre-populated utilizing at least one information item extracted from a profile associated with the user.

14. The method of claim 9, wherein the method further comprises providing a plurality of search results in response to the second search query, at least a portion of the plurality of search results being associated with an intermediate step within the search navigation pattern.

15. The method of claim 9, wherein the method further comprises:
transmitting a visualization of the search navigation pattern; and
permitting the user to edit the search navigation pattern.

16. A system comprising:
a search engine having one or more processors and one or more computer-readable storage media;
a data store coupled with the search engine,
wherein the search engine:
receives a search query from a first user, the search query having at least one search term of a particular type;
recognizes that at least one prior search session having a search term of the particular type has been conducted by at least one of the first user and a second user;
identifies a search navigation pattern within the prior search session, wherein the search navigation pattern comprises a plurality of searches that are conducted in a particular series of prior searches associated with the search term of the particular type and are related to a same entity, the series of prior searches being conducted from one or more user computing devices of the at least one of the first user and the second user;

automatically follow s the search navigation pattern of the prior search session by conducting the particular series of prior searches related to the same entity in a subsequent search session utilizing the search term; and causes display of a plurality of search results in the subsequent search session to the first user as search results based on the following of the search navigation pattern, wherein at least a portion of the displayed plurality of search results includes at least one search result from at least two different searches in the particular series of prior related searches of the search navigation pattern conducted in the subsequent search session.

17. The system of claim 16, wherein the at least one search result of the plurality of search results includes one or more fields pre-populated utilizing at least one information item extracted from a previous search conducted by the first user or from a profile associated with the first user.

18. The system of claim 16, wherein the search engine further:

transmits a visualization of the search navigation pattern; and permits the first user to edit the search navigation pattern.

* * * * *